United States Patent
Noguchi et al.

[11] 3,951,509
[45] Apr. 20, 1976

[54] APPARATUS FOR DEFLECTING LIGHT AND SCANNING LINE CONVERSION SYSTEM

[75] Inventors: Masaru Noguchi; Tsunehiko Takahashi; Shigenori Oosaka, all of Asaka, Japan

[73] Assignee: Fuji Photo Film Co., Ltd., Minami-ashigara, Japan

[22] Filed: Apr. 16, 1974

[21] Appl. No.: 461,328

[30] Foreign Application Priority Data
Apr. 17, 1973 Japan.............................. 48-43536
Apr. 17, 1973 Japan.............................. 48-47466

[52] U.S. Cl.......................................... 350/7; 350/6
[51] Int. Cl.²......................................... G02B 27/17
[58] Field of Search ..................... 350/6, 7, 285, 3.5

[56] References Cited
UNITED STATES PATENTS
| | | | |
|---|---|---|---|
| 2,692,369 | 10/1954 | Geiser | 350/6 |
| 3,573,849 | 4/1971 | Herriot et al. | 350/7 |
| 3,625,584 | 12/1971 | St. John | 350/3.5 |
| 3,750,189 | 7/1973 | Fleischer | 350/7 |

OTHER PUBLICATIONS
Sincerbox, G. T., IMB Technical Disclosure Bulletin, Vol. 10, No. 3, Aug. 1967, pp. 267–268.

*Primary Examiner*—John K. Corbin
*Assistant Examiner*—Richard A. Rosenberger
*Attorney, Agent, or Firm*—Sughrue, Rothwell, Mion, Zinn & Macpeak

[57] ABSTRACT

A method and apparatus for deflecting a light beam having high resolution, good linearity with time and high frequency response. For deflecting a light beam, after a monochromatic light beam is applied to a light deflection unit driven by a sinusoidal AC voltage so as to carry out light deflection, the deflected monochromatic light beam is scanned on a deflection angle correction plate which comprises elemental holograms formed by a multiple-beam hologram production technique. Thereafter, the light beam passing through the deflection angle correction plate is focused on a light receiving surface to perform a uniform scanning thereon. An embodiment includes a scanning conversion system for converting a circular scanning line into a linear scanning line comprising a monochromatic light source, a light deflection member for circular-scanning a monochromatic light beam from the monochromatic light source, a deflection angle correction member for forming a deflection light beam through the circular-scanned light beam with this correction member comprising an arrangement of elemental holograms formed by a two-beam hologram production technique and a light receiving member for the diffracted light beam, in which the diffracted light beam from the deflection angle correction member is applied to the light receiving member to carry out uniform linear scanning.

4 Claims, 12 Drawing Figures

APPARATUS FOR DEFLECTING LIGHT AND SCANNING LINE CONVERSION SYSTEM

BACKGROUND OF THE INVENTION

1. Field of the Invention

This invention relates to a method and apparatus for deflecting a monochromatic light beam such as a laser beam so as to record a picture or image information on a photosensitive sheet, and to a scanning conversion system for converting a circular scanning line into a linear scanning line.

2. Description of the Prior Art

A system has been developed in which a monochromatic light such as a laser light is modulated and scanned to form a picture or image so as to obtain an apparatus for projecting and displaying the picture or image thereon, and in which the modulated monochromatic light is applied to a photosensitive sheet so as to obtain an apparatus for recording a picture or image thereon. In a method of scanning such a monochromatic light, the use of an electro-optic effect, the employment of an acousto-optic effect, the utilization of a rotatable polyhedral mirror or the use of an electromagnetic type vibration mirror such as a galvanometer has been considered. However, these scanning methods except the method employing a rotatable polyhedral mirror are not suitable from a practical standpoint. Further the deflection angle is generally so large in the scanning device using a rotatable polyhedral mirror that an expensive lens may often be required when a uniform scanning is intended. A light deflecting apparatus using the electro-optic or acousto-optic effect is expensive. A large deflection angle is not obtained, and one problem in such an apparatus is that light point resolution is decreased. In addition, although the scanning device using the electromagnetic type vibration mirror such as the galvanometer may be easily obtained, a very small vibration mirror or many vibration mirrors may be required in practical use when high speed scanning is demanded. In addition, since a saw tooth voltage, a triangle voltage or a phase modulated voltage is required for the driving power source described above, broad-band properties may become important and the driving power source can be complicated.

SUMMARY OF THE INVENTION

It is an object of the invention to provide an improved method and apparatus for deflecting monochromatic light.

Another object of the invention is to provide an inexpensive light deflecting apparatus having high resolution, good linearity with time and high frequency response.

It is an object of the invention to provide an improved system for converting a circular scanning into a uniform linear scanning, using an easily available circular scanning deflection element with high performance.

A further object of the invention is to provide an improved system for obtaining a desired image of required size on a light receiving surface by means of the uniform linear scanning.

In accordance with the light deflecting apparatus of the invention, a laser beam is first modulated by a light modulator which is operated by a picture or image signal. The modulated laser beam is applied to a lens to obtain a light beam having a desired diameter. The light beam from the lens is applied to a reflection mirror which is attached to one end of a light deflecting unit such as a bender-bimorph scanner. The light beam deflected from the mirror is then applied to a deflection angle correction plate which comprises an arrangement of very small holograms which are formed using a multiple-beam hologram production technique such as two-beam hologram production technique. Since the light beam which has passed through the deflection angle correction plate contains the first order diffraction light beam required to record a picture or image information on a photosensitive sheet, and the zero order diffraction light beam which is not required for recording, a light shielding plate to remove the unwanted light beam is located between the photosensitive sheet and the deflection angle correction plate. In such an apparatus, the desired light beam passing through the deflection angle correction plate having an arrangement of elemental holograms, that is, very small holograms, is focused on the photosensitive sheet, and simultaneously a flying spot uniform scanning is applied to the photosensitive sheet, so that a picture or image can be recorded on the photosensitive sheet corresponding to a picture or image signal from a magnetic tape unit.

In an embodiment of this invention a scanning line conversion system is provided in which, a laser light beam is first modulated by a light modulator which is operated by an image signal. The modulated laser beam is applied to an inverse telescopic lens system to obtain a light beam with a desired diameter. The light beam from the lens system is applied to a light deflection element through a reflection mirror and is then circular-scanned. The light deflection element to perform the circular scanning is formed on or attached to one end of an axis of a motor which is driven by a sinusoidal AC voltage generator. The light beam from the deflection element is applied to a deflection angle correction plate on which a large number of very small holograms are circularly arranged which is formed by a series of two-beam hologram production techniques, so that circular scanning is achieved on the deflection angle correction plate. Since the light beam having passed through the deflection angle correction plate contains the first order diffracted light beam required to record an image information on a photosensitive sheet and the unwanted zero order diffracted light beam, a light shielding plate for removing the unwanted zero order diffraction light beam is placed between the deflection angle correction plate and the photosensitive sheet, the first order diffracted light beam having passed through the deflection angle correction plate with a large number of very small holograms can be focused on the photosensitive sheet, and the flying spot scanning speed at each scanning spot in one scanning period can also be equal and the scanning line can be linear, so that circular scanning can be converted into a linear scanning. If the laser beam is modulated by an image signal which is supplied from, for example, a magnetic tape unit, the image corresponding to the image signal can be recorded on the photosensitive sheet.

BRIEF DESCRIPTION OF THE ACCOMPANYING DRAWINGS

DESCRIPTION OF THE PREFERRED EMBODIMENTS

Figure 1:
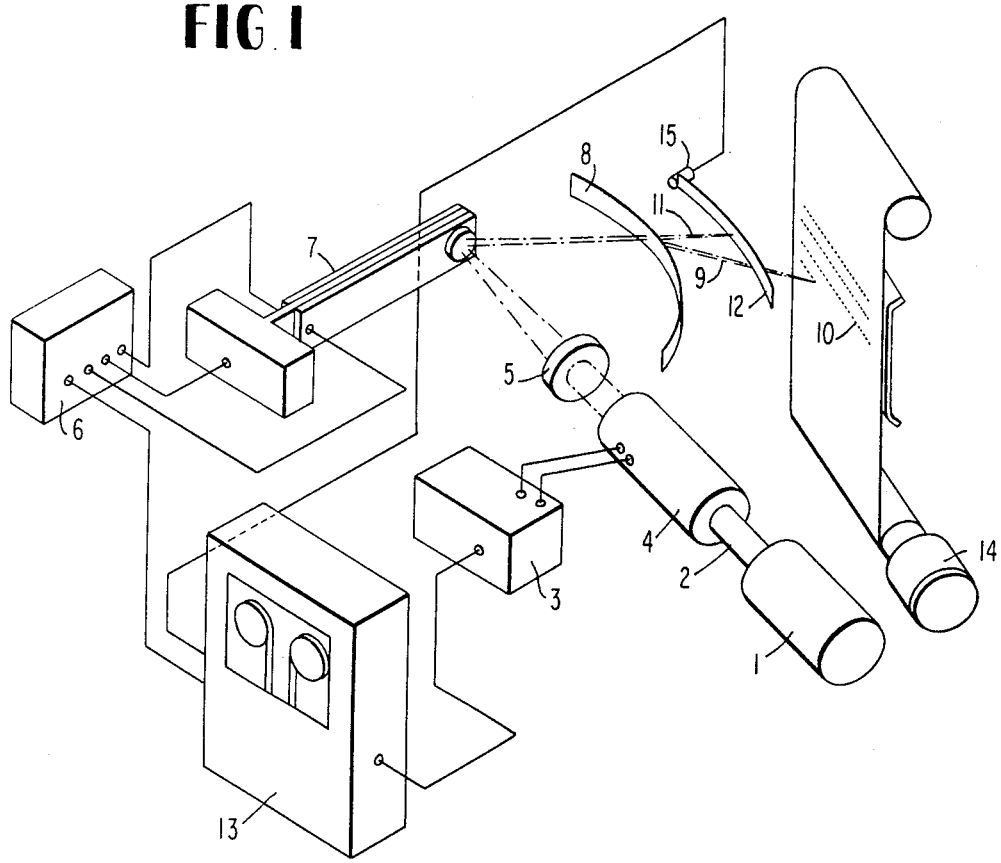
FIG. 1 is one embodiment of the invention applied to a recording system wherein a picture or image information stored in a magnetic tape unit is recorded on a photosensitive sheet.

One embodiment of the present invention relates to a method and apparatus for deflecting a light beam, the method comprising applying a monochromatic light beam to a light deflection unit driven by a sinusoidal AC voltage so as to deflect the light scanning the deflected monochromatic light beam on a deflection angle correction plate, the correction plate comprising an arrangement of elemental holograms formed by two-beam hologram production technique, and focusing the light beam passed through the deflection angle correction plate on a light receiving surface to perform a uniform scanning.

According to this embodiment, any light deflection unit can be used if the direction of propagation of the light is varied by an external signal. Particularly, it may be preferable to use an electromagnetic type vibration mirror, which is presently readily available and has the desired performance characteritics, driven by a sinusoidal AC voltage or a sinusoidal AC voltage or current containing some sinusoidal harmonic waves, to employ a light deflection unit made of materials having an electro-optic effect, such as a potassium tantalate niobate crystal, lithium tantalate and the like, or to utilize a rotatable polyhedral mirror which is connected to a motor driven by a sinusoidal voltage. More particularly, an acousto-optic light deflection unit can also be used in which tellurium dioxide, lead molybdate and the like are employed as an acoustic wave medium. The materials such as tellurium dioxide and lead molybdate can result in a deflection effect by combining a high frequency power source with a sweep generator.

As the monochromatic light, in addition to a laser light, other light can be used which is obtained by attaching a narrow-band optical filter to a light source having a relatively broad light emitting spectrum, such as incandescent lamps, discharge lamps or light emitting diodes.

The deflection angle correction plate, comprising an arrangement of elemental holograms formed using a two-beam hologram production technique, can correct the deflection angle of the monochromatic light beam deflected through the light deflection unit, and can maintain constant the scanning speed of the light beam on the light receiving surface.

The light receiving surface can indicate a surface at a position where a screen is placed, when the present invention is applied to a device for displaying a picture or image, for example, by projecting it onto the screen. When the present invention is applied to a device for recording a light image by illuminating the image on a sheet photosensitive material, for example, the light receiving surface can represent a surface at a position where the photosensitive sheet is placed. When the present invention is applied to a flying spot scanning device, the light receiving surface can show a surface at a position where a copy to be read is placed. However, when it is required to enlarge or reduce a picture in the light receiving surface so as to display or record the picture, it is a matter of course that the light receiving surface can also indicate a position where a lens used in the enlargement or reduction process of the picture is placed.

To carry out uniform scanning on the light receiving surface means that the monochromatic light deflected by the light deflection unit driven by the sinusoidal AC voltage, for example, is uniformly scanned on the light receiving surface even if the scanning speed at the different portions of the scanning line on the deflection angle correction plate is different from one another.

FIG. 1 shows one embodiment of the present invention applied to a recording system wherein a picture or image information stored in a magnetic tape is recorded on a photosensitive sheet. In the drawing, a light beam 2 emitted from a laser light source 1 is intensity-modulated by a light modulator 4 which is operated by a picture signal given by a light modulation power source 3, and is applied to a lens 5. By means of a reflection mirror which is attached to one end of a light deflection unit 7 driven by a sinusoidal AC voltage generator 6, a light deflection angle correction plate 8 comprising elemental holograms is scanned in one dimension by deflected light of the laser light beam whose diameter is corrected by the lens 5, but a uniform scanning is not always carried out at a position of the deflection angle correction plate 8. However, the light beam passing through the deflection angle correction plate 8 on which elemental holograms are arranged can be focused on a photosensitive sheet 10 and simultaneously the uniform flying spot scanning speed may be obtained on the entire surface of the photosensitive sheet 10. Such a deflection angle correction plate 8 can be made by utilizing a hologram production technique as described later. Particularly, considering a two-beam hologram, the unwanted light beam 11, as well as the wanted light beam 9 required for recording the picture information on the photosensitive sheet, is included in the light beam passing through the deflection angle correction plate 8. Therefore, a light shielding plate 12 may be disposed between the photosensitive sheet 10 and the deflection angle correction plate 8 in order to remove the unwanted light beam 11.

In the recording system shown in FIG. 1, a picture signal from a magnetic tape unit 13 is applied to the light-modulation power source 3, a horizontal synchronizing signal from the magnetic tape unit 13 is provided to a sinusoidal AC voltage generator 6, and the photosensitive sheet 10 is moved at approximately right angles to the scanning direction of the light beam 9 by means of a synchronous motor 14. Accordingly, the desired picture corresponding to the picture signal can be recorded on the photosensitive sheet.

The light deflection unit 7 as shown in FIG. 1 is called a "Bender-Bimorph Scanner" which was proposed J. J. Shaffer et al, Applied Optics Vol 9, No. 4 p. 933 (1970). However, an electromagnetic vibrating mirror or a light deflection unit of materials having a large electro-optic effect can also be used.

For recording a picture or image information on a photosensitive sheet, it is possible to control the operation of the magnetic tape unit 13 by detecting the unwanted light beam 11 with a photodetector which is disposed at the position of the light shielding plate 12.

In the recording system shown in FIG. 1, a blanking signal is generated at the magnetic tape unit 13 during a time period when the light beam returns, so that the light beam can be cut off by means of the light modulator 4.

Figure 2:
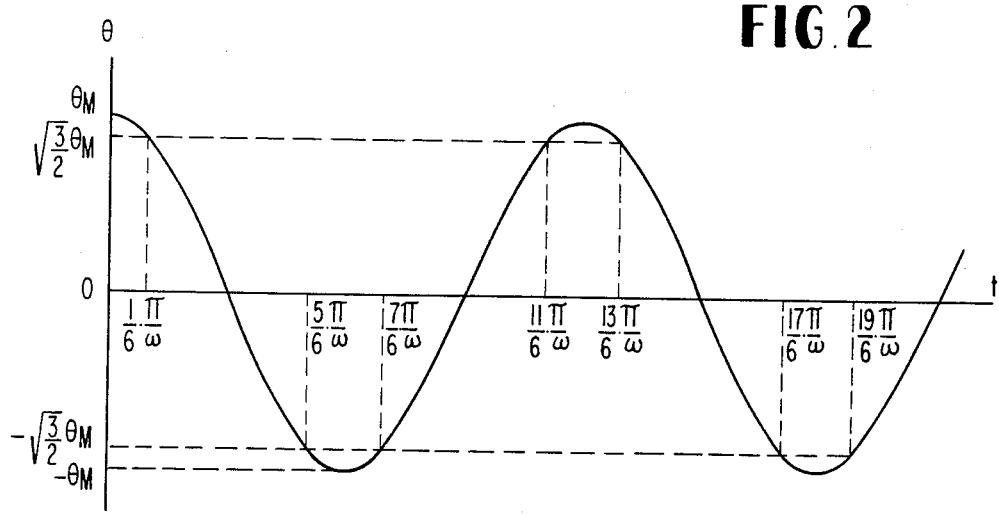
FIG. 2 shows the relation between the time (t) and the light deflection angle (θ) when a sinusoidal AC voltage is applied to a resonance type light deflecting unit to deflect the light beam as used in FIG. 1.

FIG. 2 shows the relation between the time t and the light deflection angle $\theta$ when a sinusoidal AC voltage is applied to a resonance type deflection unit such as the light deflection unit shown in FIG. 1 so as to deflect the light beam. That is, the deflection angle of the deflected light beam is sinusoidally varied with respect to a time variable t by means of the resonance type deflection unit. Therefore, if the maximum deflection angle of a plus sign is represented by $\theta_M$ and the angular frequency of the deflection is designated by $\omega$, the deflection angle $\theta(t)$ at a time $t$ will be expressed by $$\theta(t) = \theta_M \cos(\omega t) \qquad (1)$$

In this case, the neighbourhood of the maximum value $\theta_M$ is usually unemployable in practice because the scanning speed becomes nearly zero at the period of time when the deflection angle becomes nearly the maximum value $\theta_M$. Therefore, the term "effective deflection angle" as used herein is intended to mean the range of deflection practically employed. For example, the effective deflection angle is represented by a section of the thick line as shown in FIG. 2, when the scanning is carried out using the light beam of which the deflection angle is within the effective deflection angle, $\sqrt{3}/2$ of the maximum deflection angle $\theta_M$.

An explanation on how the correction of the deflection angle within the effective deflection angle is carried out will be given with reference to FIGS. 3 and 4.

Figure 3:
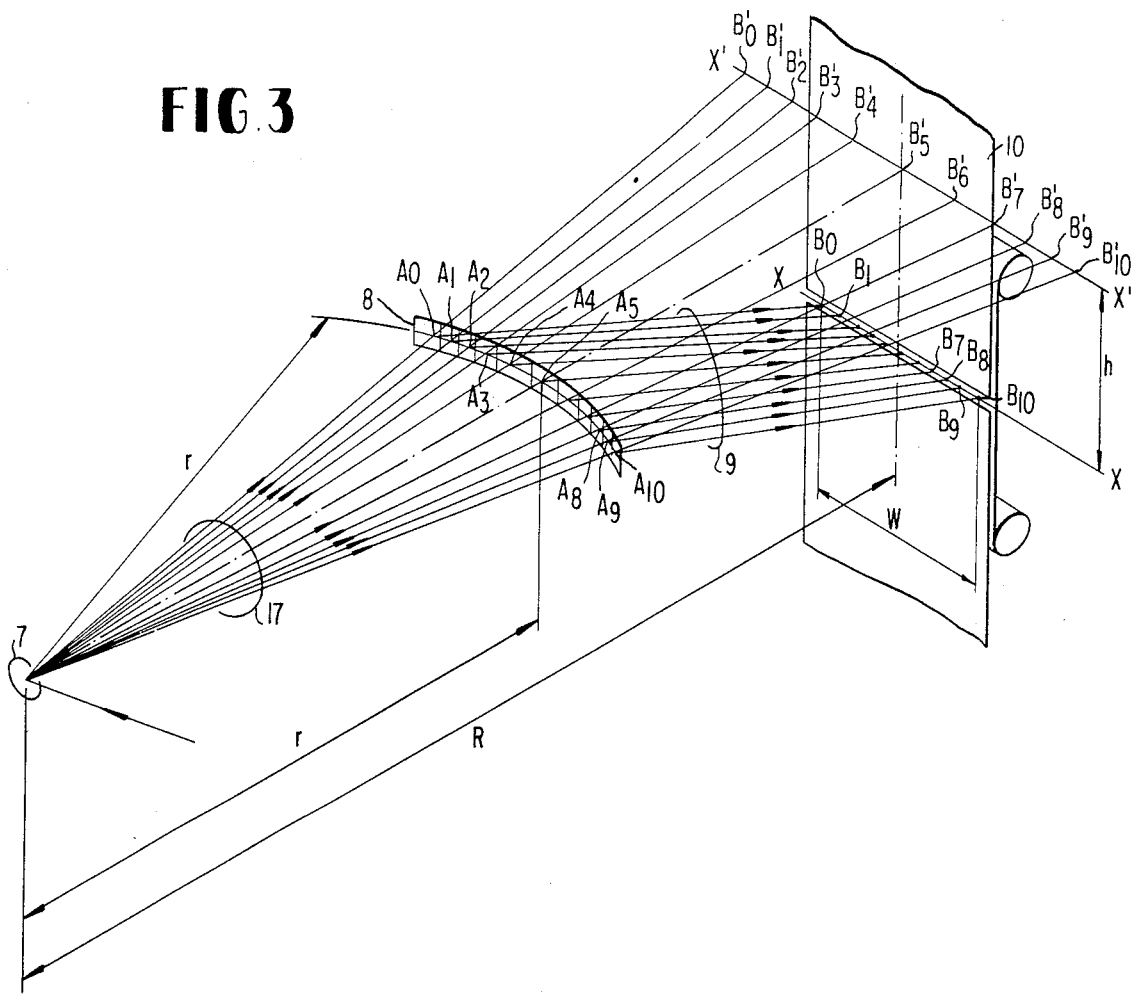
FIGS. 3 and 4 are enlarged perspective and plane views, respectively, showing a light deflecting unit, a light deflection angle correction plate, a surface of a photosensitive material and a light beam, as in FIG. 1.
Figure 4:
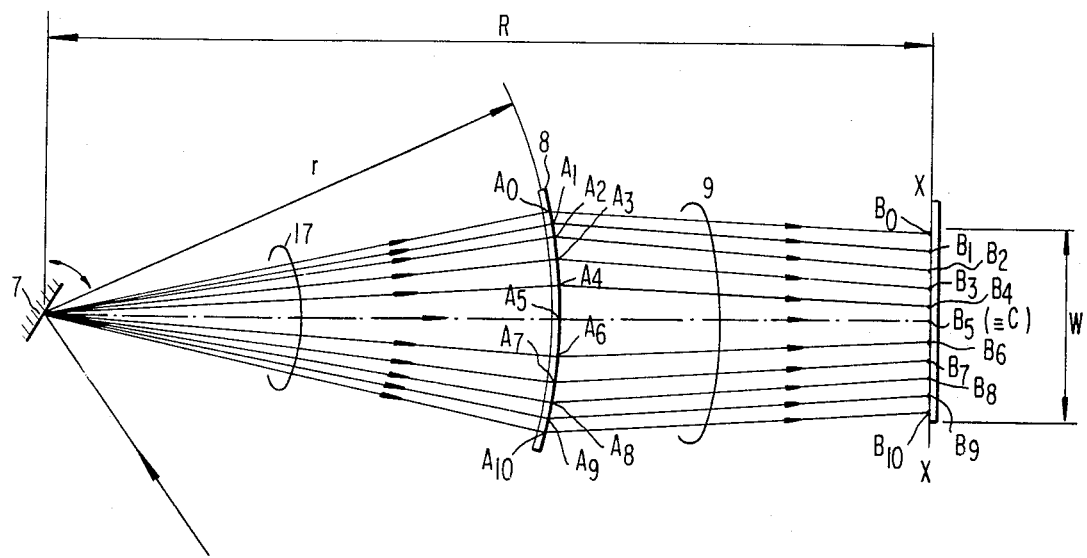

FIGS. 3 and 4 are enlarged views to show the respective portions of the light deflection unit 7, the deflection angle correction plate 8, the surface of photosensitive sheet 10 and the light beam 9, wherein FIG. 3 is a perspective view and FIG. 4 is a plane view, respectively. When a sinusoidal AC voltage as an input is applied to the light deflection unit 7, the vibration of the light deflection unit 7 is operated in such a manner that the light beam deflection angle of the deflected light is given by the equation (1). Therefore, as the range of the time period to give the effective deflection angle, the following range can be considered;

$$\frac{1}{6} \cdot \frac{\pi}{\omega} \leq t \leq \frac{5}{6} \cdot \frac{\pi}{\omega}$$

Accordingly, the time period T required for generating one scanning line is given by $$T = \frac{5}{6} \cdot \frac{\pi}{\omega} - \frac{1}{6} \cdot \frac{\pi}{\omega} = \frac{2}{3} \cdot \frac{\pi}{\omega}$$

This relation is illustrated in the horizontal axis of FIG. 2. If the time period T is divided into 2N, (2N+1) dividing points containing both ends correspond to (2N+1) light spots $A_0, A_1, A_2, \ldots, A_{2N}$, each being unequal intervals on the deflection angle correction plate 8, as shown in FIGS. 3 and 4 (where the division number is given by 2N=10). Therefore, after the light beam has passed through the deflection angle correction plate 8, a number (2N + 1), of a light spots $B_0, B_1, B_2, \ldots, B_{2N}$, can be positioned at equal intervals on a line X—X on the light receiving surface 10, on which the scanning with uniform speed is to be realized.

In FIGS. 3 and 4, although the division number is given by 2N = 10 in order to simplify the drawings, this corresponds to the number of points to be resolved on one scanning line, and the division number of the order of 2N = 700 may be required if the same resolution as that of commerical television, for example, is desired.

It is possible to carry out the correction of the deflection angle as described above by arranging a number, (2N + 1), of very small holograms on the deflection angle correction plate 8. Such small holograms may be recorded in the manner which will be described later refering to FIG. 5. In general, holograms diffract the incident light beam into many orders of which the direction is different from one another. However, when the first order diffracted light beam obtained by illuminating with a light which satisfies Bragg's diffraction condition is employed, the aberration will become minimum, and further the brightness of the diffracted light beam will be increased. In FIG. 3, since the light beam 17 directed from the light deflection unit 7 acts as an illuminating light for the deflection angle correction plate (the arrangement of elemental holograms), it is possible by two-beam hologram production technique that the zeroth order diffraction light beam from the deflection angle correction plate intersects the points $B_0', B_1', B_2', \ldots B_{2N}'$ at unequal intervals on the line X'-X' in the light receiving surface, and that the 1st order diffraction light beam intersects the points $B_0, B_1, B_2, \ldots, B_{2N}$ at equal intervals on the line X—X in the light receiving surface.

Figure 5:
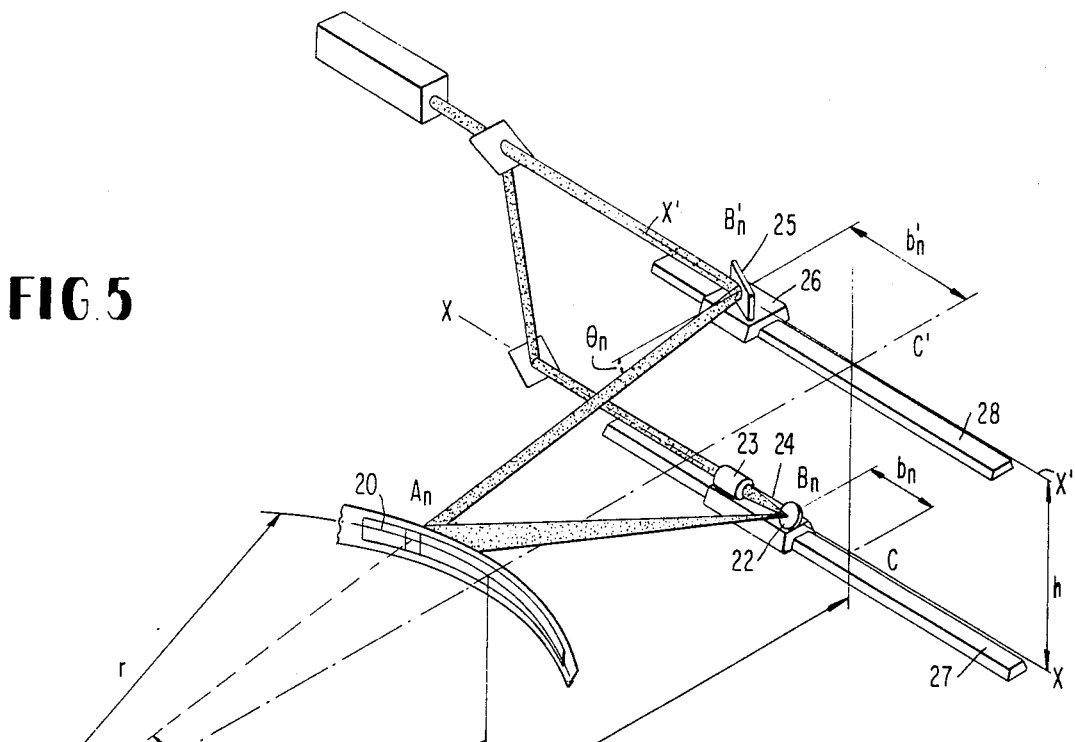
FIG. 5 is a process for making two-beam holograms.

FIG. 5 shows how to produce two-beam holograms as the deflection angle correction plate described above. As shown in FIG. 3, the distance between the light deflection unit 7 and the deflection angle correction plate 8, and the distance between the light deflection unit 7 and the light receiving surface 10 are expressed by r and R, respectively, and the distance between two lines X—X and X'—X' on the light receiving surface is represented by h, and the effective width of the light receiving surface by w. When the holograms are recorded, a photosensitive sheet 20 for recording the holograms is disposed along the circumference of diameter r, and optical members 22, 23, 24, 27, 25, 26 and 28 are positioned on the plane having the distance R from the center 7' of the circumference. For example, numerals 22 and 25 represent a reflection mirror, 23 a focusing lens, 24 and 26 a movable stage, 27 and 28 an optical bench, respectively. Further, the mutual relation between the arrangements of each optical member is described. The center 7', the photosensitive sheet 20, the optical members 25, 26 and 28 are in a plane, the optical members 22, 23, 24, 27, 25, 26 and 28 are in another plane. These two planes are at right angles. And the distance between the optical members 27 and 28, that is, between the optical benches is $h$ within the latter plane.

The optical members 25, 26 and 28 are intended to form a parallel light beam which is directed to the light deflection unit 7 from the position of points $B_0'$, $B_1'$, $B_2'$, ..., $B_{2N}'$ of zeroth order diffracted light beam in FIG. 3, and the optical members 22, 23 and 24 are intended to form a light beam which diverges from the position of points $B_0$, $B_1$, $B_2$, ..., $B_{2N}$ where the +1st order diffracted light beam is to be focused and is directed to very small areas on the corresponding photosensitive sheet. For example, the formation of the $(n+1)$th elemental hologram at a very small area containing a point $A_n$ were be explained. The central point of the uniform scanning line on the line X—X is represented by C, and the point of the distance $h$ directly overhead the point C is given by C'. In this case, when the distance between the points C and $B_n$, and the distance between the point C' and $B_n'$ are expressed by $b_n$ and $b_n'$, respectively, the following relation will be obtained;

$$b_n = (N-n) \cdot (w/2N) \qquad (2)$$

$$b_n' = R \tan \theta_n = R \tan (\theta_M \cos (\omega t_n)) \qquad (3)$$

where $$t_n = \frac{1}{6} \cdot \frac{\pi}{\omega} + n \cdot \frac{T}{2N} = \frac{1}{6} \cdot \frac{\pi}{\omega} + \frac{n}{2N} \cdot \frac{2}{3} \cdot \frac{\pi}{\omega} = \frac{1}{6}\left(1 + \frac{2n}{N}\right)\frac{\pi}{\omega}.$$

Accordingly, $$b_n' = R \tan\left[\theta_M \cos\left\{\frac{1}{6}\left(1 + \frac{2n}{N}\right)\pi\right\}\right] \qquad (4)$$

can be obtained.

So, if a point light source is positioned at the point $B_n$ of which the distance from the central point C is prescribed by the equation (2), thereby to direct a spherical wave to the area An of the photosensitive sheet, and also a plane wave is directed, to the point 7' from the point $B_n'$ of which the distance from the point C' is prescribed by the equation (4), then the two waves interfere on the area $A_n$ of the photosensitive sheet. If the interference pattern is recorded on the area $A_n$ of the photosensitive sheet the desired $(n+1)$th elemental hologram can be produced. By repeating such a procedure (2N=1) times ($n = 0$ to 2N), a desired deflection angle correction plate on which elemental holograms are arranged can be obtained.

In the embodiment described above, although a process of a typical two-beam hologram production technique for making a deflection angle correction plate and a method and apparatus for deflecting a light using a resultant correction plate are explained, a deflection angle correction plate formed by general multiple-beam hologram production techniques can also be employed.

As the photosensitive material 20, silver salt materials, in a broad sense, containing evaporated silver halide materials and dry silver materials in addition to usual silver salt materials, organic materials such as photopolymers, diazo compounds and photochromic materials, inorganic materials such as amorphous semiconductor materials and materials having large optical damage effect, dichromated gelatin, and metallic materials such as manganese and bismuth can be utilized.

According to this embodiment of the present invention, as described above, since good results as the light deflecting apparatus are obtained even if the frequency response of the light deflection unit to be used is not quite excellent, increased resolution can be obtained and the cost can be low when the light deflecting apparatus is used to record picture or image information on a photosensitive sheet. For example, if a saw tooth voltage is applied to a galvanometer having a flat frequency characteristic over a direct current to 1 KHz for light-sweeping, the sweep frequency can not be increased to above 160 Hz even if it is bearable to operate the galvanometer with only a sixth harmonic wave and lower order ones of the driving voltage waveform. On the other hand, in the light deflecting apparatus in accordance with the invention, however, if the frequency response at 1 KHz is possible in the galvanometer of the light deflection unit, the sweep frequency can be increased to 1 KHz, and the flat frequency characteristic over direct current to $k$ KHz is not required. Although a light deflection unit having an increased single frequency response from 10 KHz to 100 KHz becomes practical for use if an electromagnetic resonance is employed, the time linearity of the light scanning speed may not be obtained since sharp mechanical resonance must be utilized in general. On the contrary, inexpensive light deflection unit having a high performance from 10 to 100 KHz can be realized because the time linearity of the light scanning is easily obtained if the method of the invention is applied thereto.

Further, in accordance with this embodiment of the invention, the time linearlity at light scanning can be increased without distorting the light receiving surface and without changing the waveform of the driving voltage.

Even further, the power source to drive the light deflection unit is simple in accordance with this embodiment of the invention. For example, since a power source is required to amplify only electric power with a certain frequency that is calculated by a scanning speed required for scanning, the power source can be simplified when an electromagnetic type light deflection unit is employed.

Still further, although it is possible to use a light deflection unit made of material having large electro-optic effect in high frequency regions, such a light deflection unit requires a high driving voltage and high electric power. In accordance with this embodiment of the invention, on the contrary, improved effects can be obtained because a light deflection unit with large electro-optic effect is not required.

In an embodiment of this invention a scanning line conversion system is provided, which comprises a monochromatic light source, a light deflection member for circular-scanning the monochromatic light beam from the light source, a deflection angle correction plate for forming a diffracted light beam, this correction plate comprising elemental holograms made by a series of two-beam hologram production techniques, and a light receiving surface on which the diffracted light beam from the deflection angle correction plate is uniformly linear-scanned.

In accordance with this embodiment of the invention, for carrying out circular scanning, a mirror surface can be used which is obtained by cutting a shaft of a conventional motor at an angle with respect to the axis of the shaft, or a prism attached to one end of the shaft of a conventional motor can also be employed. It is possible to drive these circular scanning elements with a sinusoidal AC voltage, and these scanning elements can have high performance and can be obtained inexpensively.

The following circular scanning method may also be utilized; AC voltages, each amplitude and frequency of which is equal and each phase of which is different by 90°, are applied to first and second light deflection elements so that a circular Lissajous figure can be obtained, using two light deflection elements which utilize an electro-optic or acousto-optic effect or electromagnetic resonance type vibration mirrors.

The monochromatic light beam employed in this embodiment of the invention is a light beam emitted from a laser light source or a light beam emitted from a light source which is obtained by attaching a narrow-band optical filter to a light source having a relatively broad light emitting spectrum, such as incandescent lamps, discharge lamps, light emitting diodes and the like.

The deflection angle correction plate used in this embodiment can be a formed by a series of two-beam hologram production techniques as described above with reference to FIG. 5, or a so-called computer hologram production technique. Such a deflection angle correction plate can correct the deflection angle of the monochromatic light beam which is deflected so as to carry out circular scanning, and, therefore, perform uniform linear scanning on the light receiving surface.

The light receiving surface is a surface at which a screen is placed when this embodiment of the invention is applied to a display apparatus by projection of, for example, an image. Further, when this embodiment of the invention is applied to an apparatus for recording the image on a photosensitive sheet, the light receiving surface represents a surface at which the photosensitive sheet is placed. Further, when this embodiment of the invention is applied to a flying spot scanning apparatus, the light receiving surface indicates a surface at which a copy or manuscript to be read is placed.

One embodiment of this aspect of the present invention will now be described with reference to the accompanying drawings.

Figure 6:
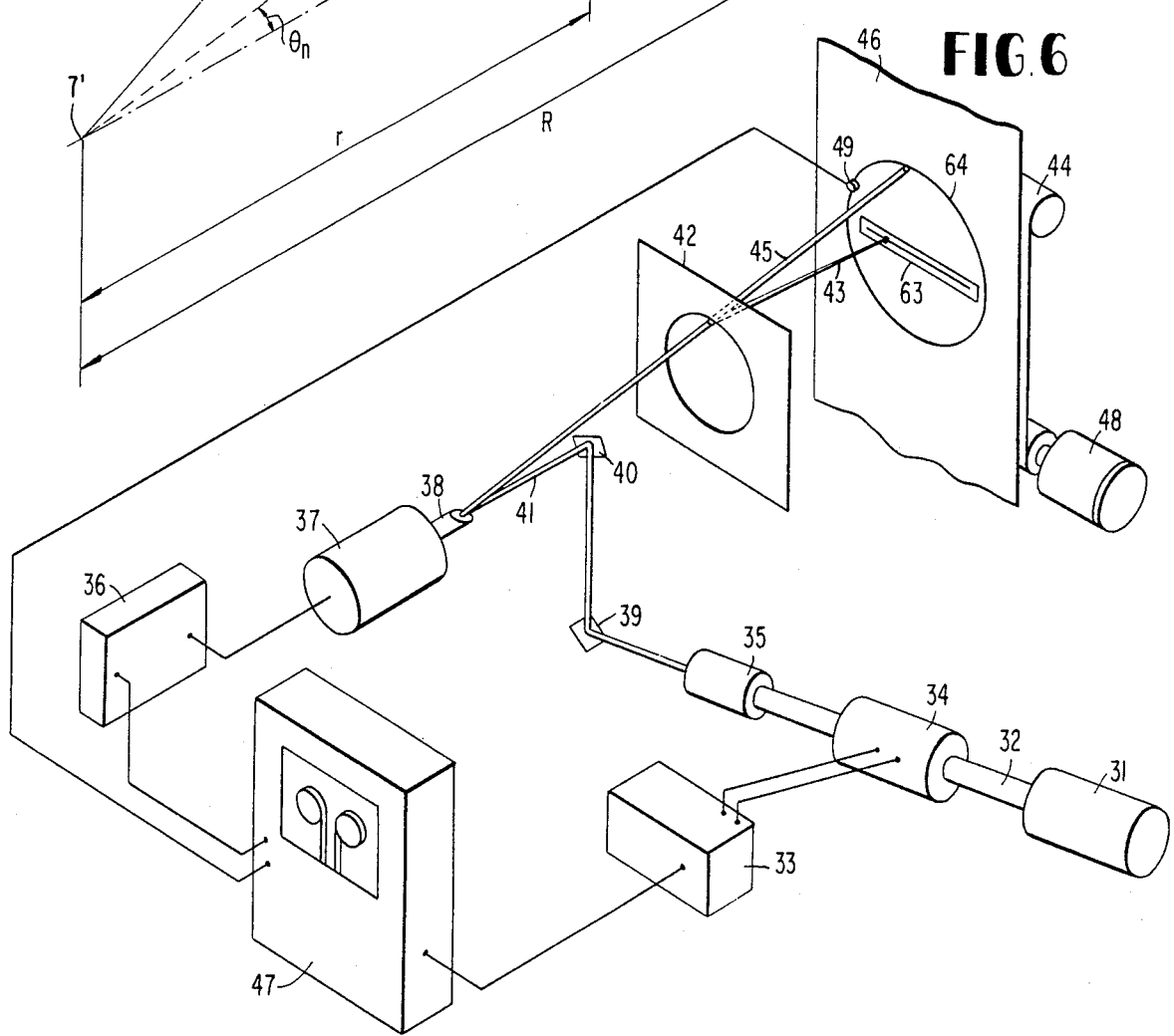
FIG. 6 is a perspective view of an embodiment of a recording apparatus to which the scanning line conversion system according to the invention is applied.

FIG. 6 shows a system for recording on a photosensitive sheet image information which has been stored in a magnetic tape. A light beam 32 emitted from a laser light source 31 is intensity-modulated by a light modulator 34 which is operated by an image signal provided by a light modulation power source 33, and the modulated light beam is applied to an inverse telescopic lens system 35. A shaft of a motor 37 driven by a sinusoidal AC voltage generator 36 is cut at an angle with respect to the axis of the shaft, and the cut surface is mirror-polished to form a light deflection element 38. The light beam from the light modulator 34 is reduced to a small diameter at the lens system 35, and is directed to the light deflection element 38 through reflection mirrors 39 and 40 and shown by a light beam 41 which is along the axis of rotation of the rotatable shaft of the motor 37. Such a light beam is then circular-scanned on a surface of a deflection angle correction plate 42 by the light deflection element 38. A light beam 43 passing through the deflection angle correction plate is focused on a surface of a photosensitive sheet 44. In this case, the flying spot scanning speed of each scanning point can be made uniform at a period of one scanning on the surface of the photosensitive sheet 44 and the scanning line can be linear. Since the deflection angle correction plate 42 is formed by a two-beam hologram production technique as described later, light beams having passed through the deflection angle correction plate 42 contain the so-called zero order diffracted light beam 45 in addition to the light beam 43 required to record the image information on the photosensitive sheet. Therefore, a light shielding plate 46 is disposed between the deflection angle correction plate 42 and the photosensitive sheet 44 to remove the unwanted light beam 45. In the recording system shown in FIG. 6, the image signal from a magnetic tape unit 47 is applied to the light modulation power source 33, and a horizontal synchronizing signal is supplied to a sinusoidal AC voltage generator 36. In this case, since the photosensitive sheet 44 is moved by means of a synchronizing motor 48 at right angles with respect to the scanning direction of the light beam 43, the desired image information can be recorded on the photosensitive sheet 44. If a pulse motor is used as the motor 37, a pulse power source can be employed instead of the sinusoidal AC voltage generator 36.

When the image information is recorded on the photosensitive sheet 44, it is possible to control the operation of the magnetic tape unit 47 by detecting the unwanted light beam 45 with a light detector 49.

Figure 7:
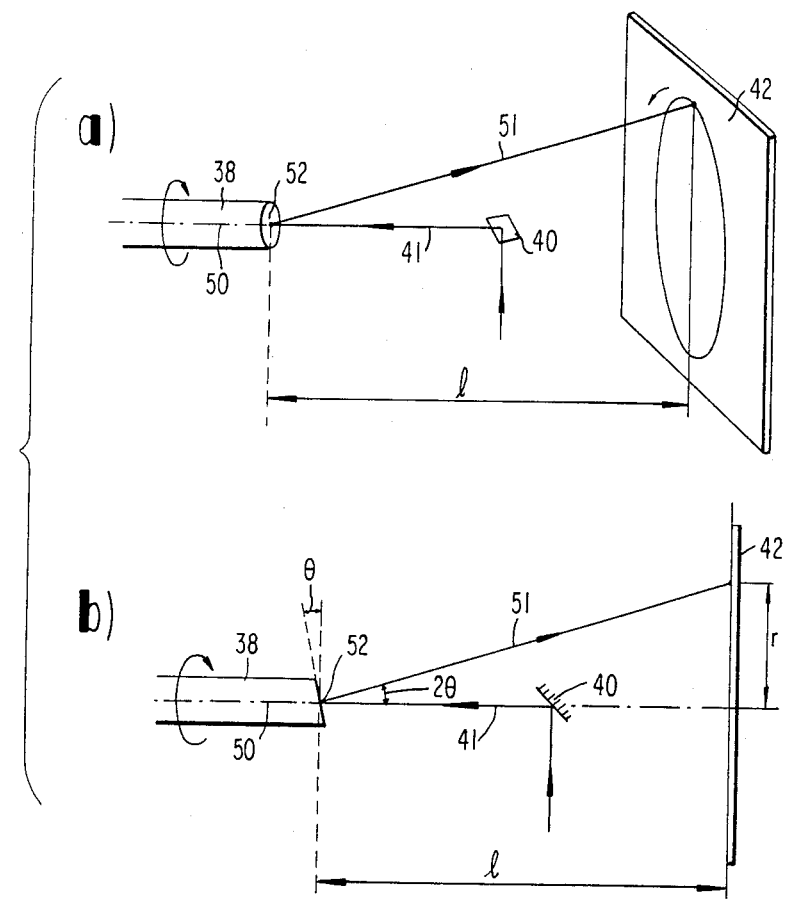
FIGS. 7 to 9 are perspective and side views of deflection elements for circular-scanning a monochromatic light beam, which can be used in the embodiment shown in FIG. 6.

FIG. 7 is a drawing to describe a condition of the circular scanning due to the light deflection element 38 wherein FIG. 7(a) and (b) show perspective and side views, respectively. Light beam 41 having a small diameter is directed to the light deflection element 38 along the axis of rotation 50 of the rotatable shaft of the motor. If the shaft of the motor is cut at an angle $\theta$ and a mirror surface is formed, the light beam 41 can be deflected at an angle 2$\theta$ to obtain a light beam 51, so that circular scanning can be achieved at the surface of the deflection angle correction plate 42 which is perpendicular to the shaft 38 of the motor when the shaft 38 of the motor is rotated. The radius r of the circular scanning can be represented by $$r = l, \tan(2\theta)$$

if the distance between a point 52 and the deflection angle correction plate 42. The point 52 is a point at which the mirror surface intersects with the axis of rotation 50 of the rotatable shaft. As is shown in FIG. 7 the shaft of the usual motor is cut at an angle to form thereon a mirror surface, and such a mirror surface is used for the light deflection element. Therefore, the structure of the light deflection element is simple, so that the fabrication thereof can be easily accomplished and high accuracy can be obtained. For making the mirror surface on the shaft of the motor, the cut surface can be optically polished, or a thin film of aluminium or chromium can be deposited on the cut surface as in a usual reflection mirror. Various light deflection elements to perform circular scanning can also be employed other than the structure shown in FIG. 7. Other light deflection elements are shown in FIGS. 8 and 9.

Figure 8:
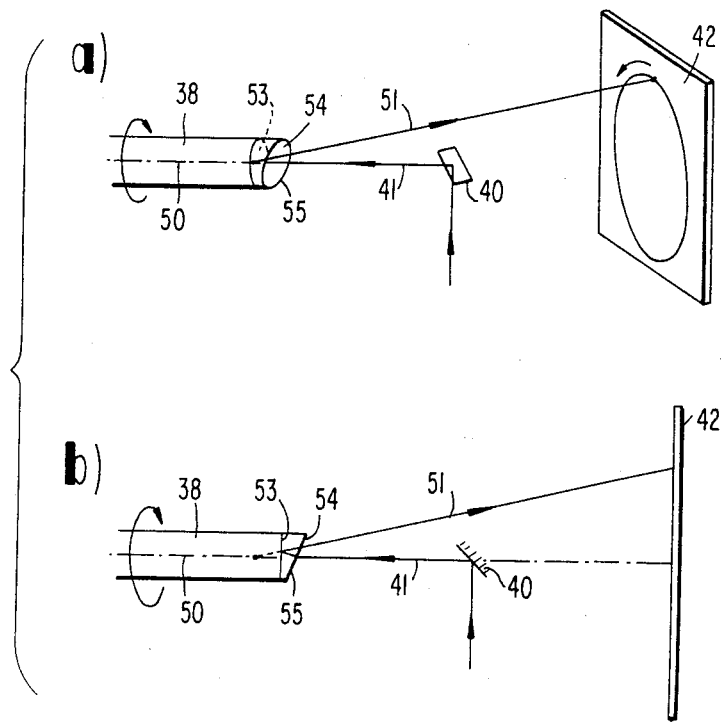

In FIG. 8, after the shaft 38 of the motor is cut at right angles with respect to the axis to form a mirror surface 53, a prism 55 having a surface 54 is attached to the mirror surface 53. FIG. 8(a) and (b) show perspective and side views, respectively. The light beam 41 directed along the axis of rotation 50 of the rotatable shaft of the motor is refracted at the surface 54 of the prism, and is reflected at the mirror surface 53. Thereafter, the light beam 41 is again refracted at the surface 54 of the prism, and is then deflected to become the light beam 51. The deflection angle correction plate 42, which is perpendicular to the shaft of the motor, is circular-scanned by the deflected light beam 51 corresponding to the rotation of the shaft of the motor.

Figure 9:
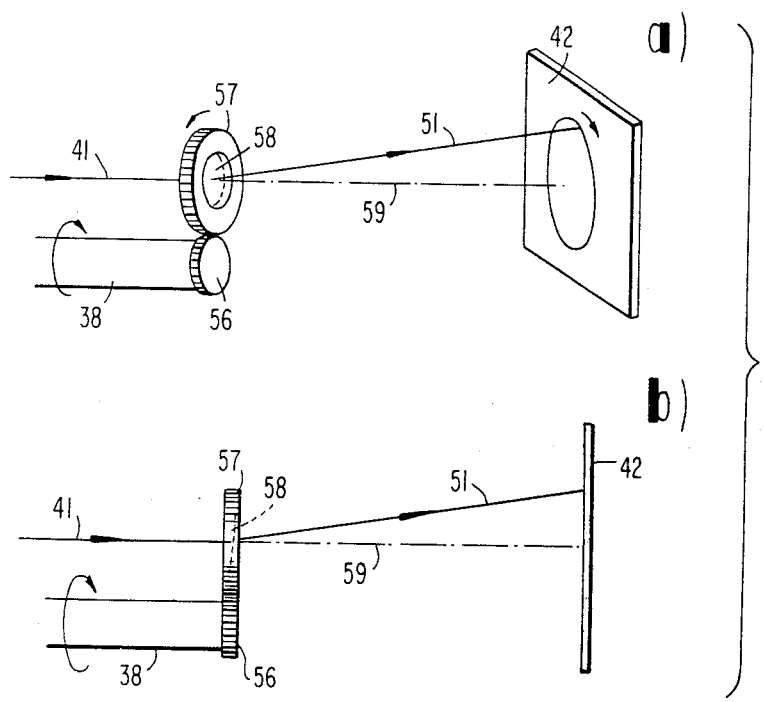

In FIG. 9, a tooth wheel 56 is coaxially fixed on the shaft 38 of the motor, and is engaged by a tooth wheel 57 whose center portion is hollowed. A prism 58 is mounted at the hollowed portion of the tooth wheel 57. FIGS. 9(a) and (b) show perspective and side views, respectively. The light beam 41 directed along the rotatable shaft 59 of the prism is refracted by the prism 58, and is then deflected to become the light beam 51. The deflection angle correction plate 42, positioned perpendicular to the rotatable axis 59 of the prism, is circular-scanned by the deflected light beam 51 corresponding to the rotation of the shaft of the motor. In this case it is a matter of course that in the circular scanning deflection element shown in FIG. 9, the circular-scanning speed is varied by the ratio of $N_1/N_2$ where $N_1$ and $N_2$ are the numbers of the teeth of the tooth wheels 56 and 57, respectively. Accordingly, high speed scanning can easily be performed.

The structure of any light deflection element for performing circular scanning, as shown in FIGS. 7 to 9, is simple, and the fabrication thereof is easy, so that light deflection elements with high accuracy can be obtained. There are other methods for carrying out circular scanning as described previously.

Figure 10:
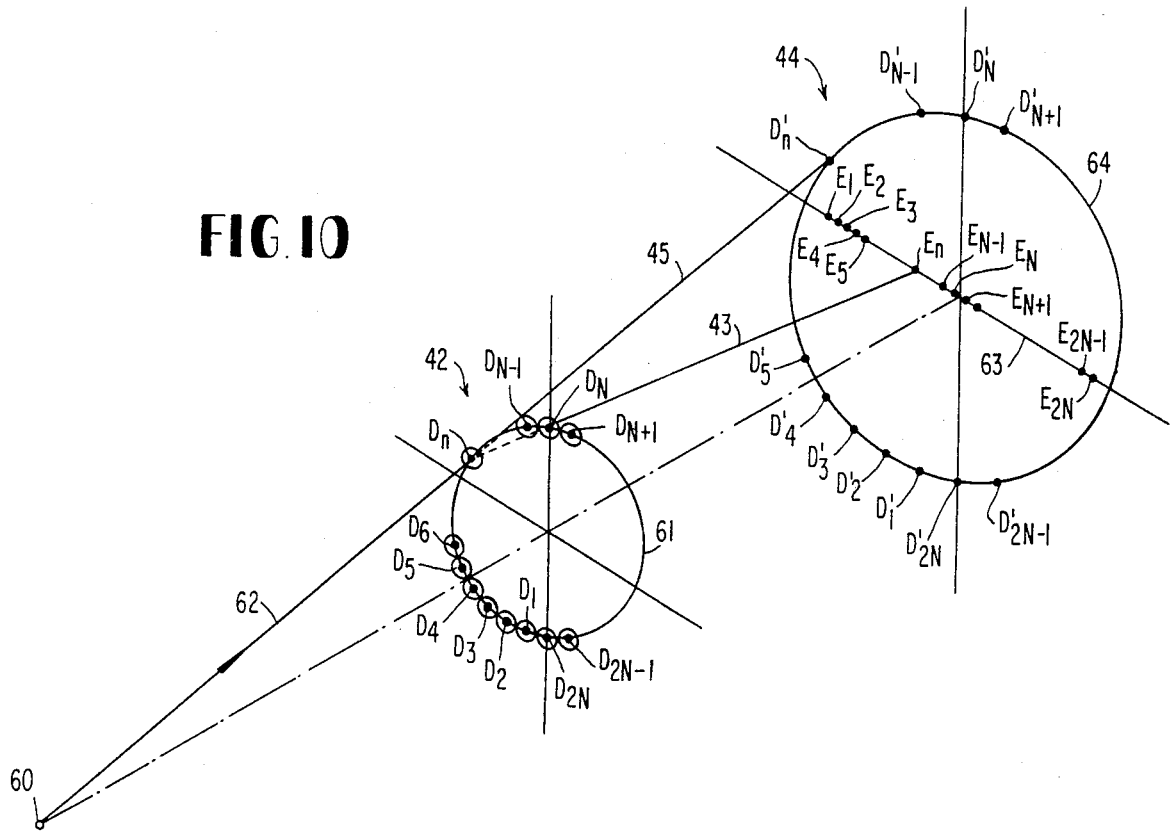
FIGS. 10 and 12 are perspective views of light paths for explaining the operation of a deflection angle correction plate to convert a circular scanning line into a linear scanning line achieved in accordance with the embodiment in FIG. 6.

FIG. 10 is a drawing showing an aspect of the deflection angle correction required for the deflection angle correction plate 12 in FIG. 6. A point 60 is an origin when a light beam having a very small diameter performs circular scanning. Such a point 60 is the point of intersection of the mirror surface and the axis of rotation 50 of the rotatable shaft of the motor in the case where the light deflection element shown in FIG. 7 is utilized for the purpose of circular scanning. A circle 61 along which the light spot scans the surface of the deflection angle correction plate 42 is divided into a number 2N. The respective dividing points are represented by $D_1, D_2, D_3, \ldots, D_n, \ldots, D_N, \ldots, D_{2N-1}, D_{2N}$. A number, 2N, of very small holograms (elemental holograms) are recorded on the very small area around each dividing point on the deflection angle correction plate. When a light beam 62 illuminates the surface of the deflection angle correction plate 42 which comprises an arrangement of very small holograms formed by a series of two-beam hologram production techniques, the light beam passing through the deflection angle correction plate can separate into the zero order diffraction light beam 45 and the first order diffraction light beam 43. A condition required for the deflection angle correction plate is that when the row of spots $D_1, D_2, \ldots, D_n, \ldots, D_{2N}$ is successively circular-scanned by the light beam 62, the first order diffracted light beam is focused to a row of spots $E_1, E_2, \ldots, E_n, \ldots, E_{2N}$ which are at equal intervals on a linear line 63 which corresponds to a uniform linear scanning line required. It is possible to form such a deflection angle correction plate by means of a two-beam hologram production technique.

Since the number of dividing points 2N corresponds to the number of points to be resolved on one scanning line, the number of the order of 2N=700 will be required if the same resolution as that of commercial television, for example, is desired.

Figure 11:
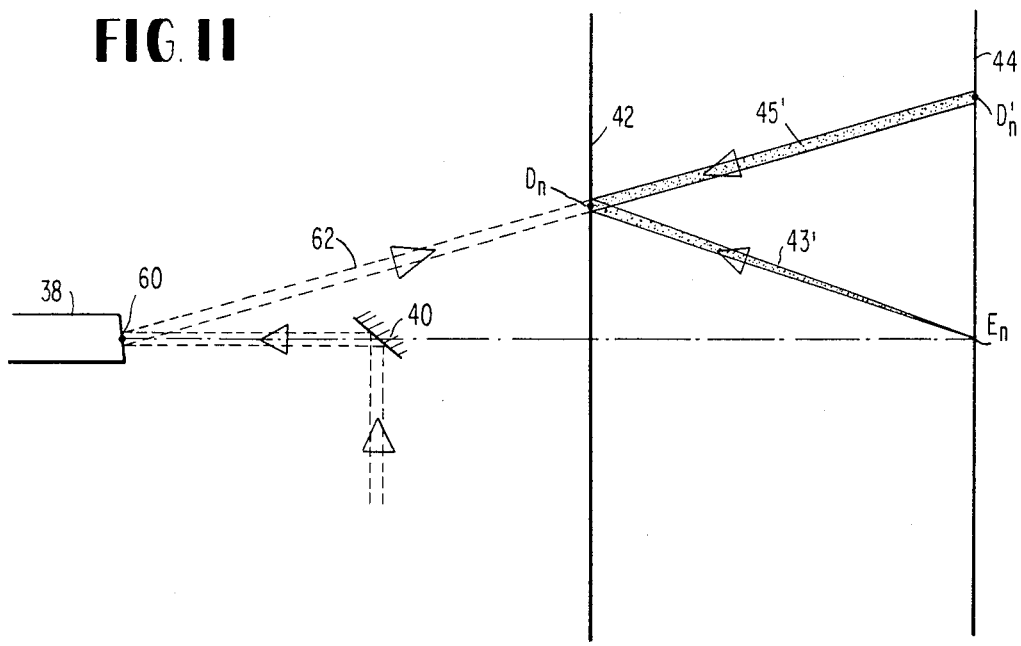
FIG. 11 is a side view of the light path for explaining the production of the deflection angle correction plate employed in the embodiment shown in FIG. 6.

The production of holograms to perform the deflection angle correction under the preferable condition is represented by a process shown in FIG. 11.

In FIG. 11, a very small hologram, which is recorded in a very small area around $n$'th dividing point $D_n$ on the deflection angle correction plate 42 formed by two-beam hologram production techinque, when illuminated by light beam 62 which is directed from the circular scanning light deflection element 38 in a condition to be utilized, should generate the zero order diffracted light beam directed to a point $D_n'$ on the light receiving surface 44, and the first order diffracted light beam directed to a point $E_n$ on the linear line of the light receiving surface on which the uniform linear scanning is to be obtained. If the parallel light beam 45' directed from the point $D_n'$ on the light receiving surface 44 to the point $D_n$ on the deflection angle correction plate 42 is regarded as a reference light beam, and if the divergence light beam 43' directed from the point $E_n$ on the light receiving surface 44 to the point $D_n$ on the deflection angle correction plate 42 is regarded as an object light beam, a hologram to cause the diffraction described above can be produced by recording the resultant interference pattern on the very small area around the point $D_n$. For making a large number of holograms on the deflection angle correction plate 42, the parallel light beam from respective points $D_1', D_2', \ldots, D_n', \ldots, D_{2N}'$ and the divergence light beam from respective points $E_1, E_2, \ldots, E_n, \ldots, E_{2N}$ are successively directed to a number, 2N, of very small areas around 2N points $D_1, D_2, \ldots, D_n, \ldots, D_{2N}$ on the deflection angle correction plate 42, and then the resultant interference patterns are successively recorded on the deflection angle correction plate 42. That is, the desired holograms can be produced on the deflection angle correction plate 42 by repeating the 2N processes described above.

Figure 12:
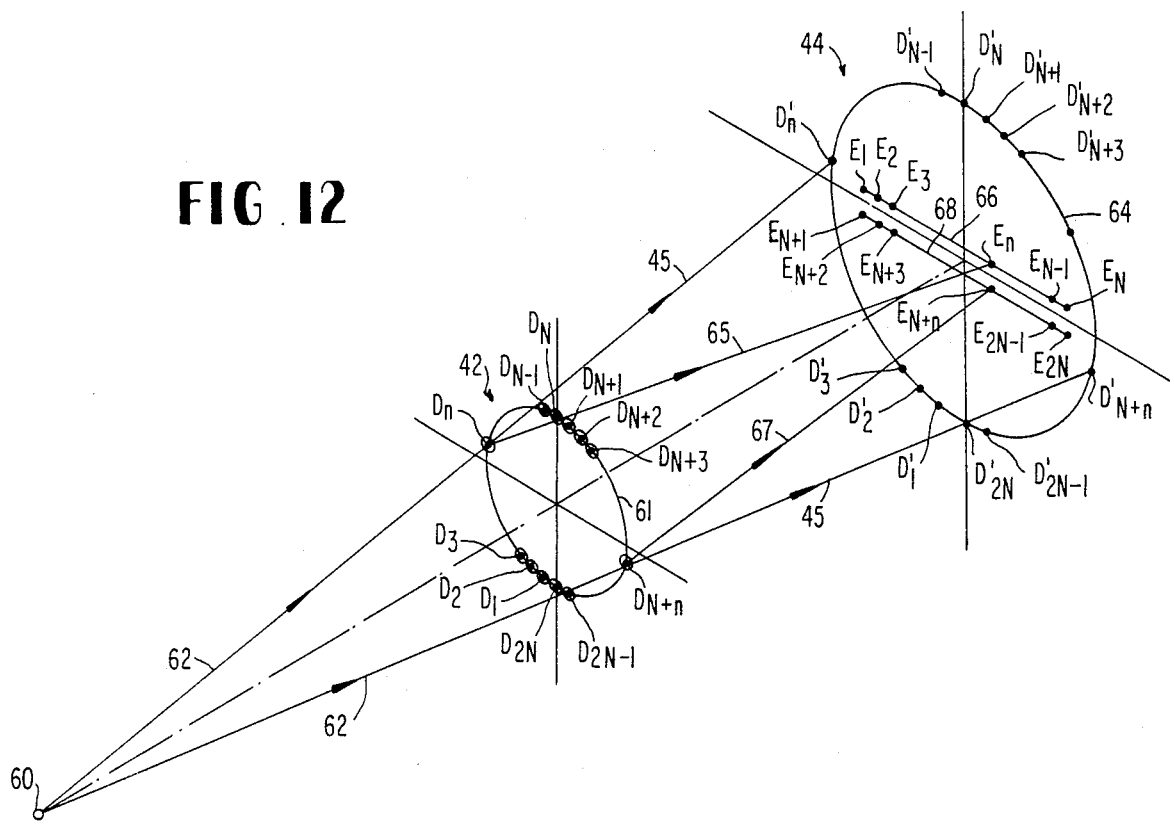

It is possible to obtain a plurality of linear scanning lines on the light receiving surface 44 corresponding to only one circular scanning on the deflection angle correction plate 42, according to the fundamental concept of this invention. FIG. 12 is one example to show an aspect of a deflection angle correction wherein two linear scanning lines are obtained on the light receiving surface by carrying out only one circular scanning on the deflection angle correction plate.

In FIG. 12, a point 60 is an origin for carrying out circular scanning. The light beam 62 circular-scanning a circle 61 on the deflection angle correction plate 42 illuminates in turn 2N dividing points $D_1, D_2, D_3, \ldots, D_n, \ldots, D_{N-1}, D_N, \ldots, D_{N+1}, D_{N+2}, D_{N+3}, \ldots, D_{N+n}, \ldots, D_{2N+1}, D_{2N}$ which are positioned on the circumference 61 and have equal intervals to each. 2N very small holograms (elemental holograms) are previously recorded on each very small area around th 2N dividing points. When N dividing points $D_1, D_2, D_3, \ldots, D_{N-1}, \ldots, D_N$ on the circumference 61 are successively scanned by the light beam 62, the first order diffracted light beam 65 derived from the n'th elemental hologram around the point $D_n$ is directed to the desired point $E_n$ on the linear line 66 on the light receiving surface 44. Further, if N dividing points $D_{N+1}, D_{N+2}, D_{N+3}, \ldots, D_{N-n}, \ldots, D_{2N-1}, D_{2N}$ on the circumference 61 are successively scanned by light beam 62, the first order diffracted light beam 67 derived from the (N+n)'th elemental hologram around the point $D_{N+n}$ is directed to the desired point $E_{N+n}$ on the other linear line 68 on the light receiving surface 44. In this case, N points $E_1, E_2, E_3, \ldots, E_n, \ldots, E_{N-1}, E_N$ on the linear line 66 and N points $E_{N+1}, E_{N+2}, E_{N+3}, \ldots, E_{N+n}, \ldots, E_{2N-1}, E_{2N}$ on the linear line 68 will be disposed at equal intervals. Therefore, two uniform linear scanning lines 66 and 68 can be obtained on the light receiving surface 44 when one circular scanning is carried out on the deflection angle correction plate 42 along its circumference 61. In this case, the resolution number on one linear scanning line becomes N, which is reduced by a half compared with the resolution number shown in FIG. 10. In the particular case of this, two linear lines 66 and 68 may coincide with each other. That is, two is, two scannings can be performed by only one circular scanning. In this case, since two linear scanning lines appear on the same position in the period of one circular scanning, the feeding speed of the photosensitive sheet 44 can be increased by two times when such a scanning technique is applied to the recording system as shown in FIG. 1.

Although the description herein is the obtaining of two linear scanning lines in a period of one circular scanning, it will be apparent that a large number of, for example, more than three linear scanning lines can also be obtained.

In FIGS. 6, 10 and 12, the uniform linear scanning line on the light receiving surface 44 is represented within the path 64 of the zero order diffracted light beam 45. However, if the interference patterns are recorded on the deflection angle correction plate 42 by means of the two-beam hologram production technique, it is possible to obtain a linear scanning line having desired position and length by choosing the position and the interval of the light spot $E_1, E_2, E_3, \ldots, E_{2N}$. Accordingly, the recording area with a desired size can be obtained on the light receiving surface.

While the invention has been described in detail and with reference to specific embodiments thereof, it will be apparent to one skilled in the art that various changes and modifications can be made therein without departing from the spirit and scope thereof.

What is claimed is:

1. A scanning line conversion system comprising a monochromatic light source,
a light deflection member for circular-scanning a monochromatic light beam from said light source,
a deflection angle correction member for forming a desired diffracted light beam from the circular-scanned light beam, said correction member comprising an arrangement of two-beam elemental holograms, and a light receiving member for said diffracted light beam, said diffracted light beam from said deflection angle correction member being applied as a fixed-size spot to said light receiving member to carry out a uniform linear scanning thereon.

2. The scanning line conversion system as defined in claim 1 including means for modulating said monochromatic light beam by an image signal, whereby desired images are recorded on said light receiving member.

3. The scanning line conversion system as defined in claim 1, wherein said elemental holograms are circularly arranged on said deflection angle correction member.

4. The scanning line conversion system as defined in claim 1, including a light shielding member to pass said desired diffracted light beam and to block an undesired diffracted light beam, said shielding member being disposed between said deflection angle correction member and said light receiving member.

* * * * *